Figure 1:
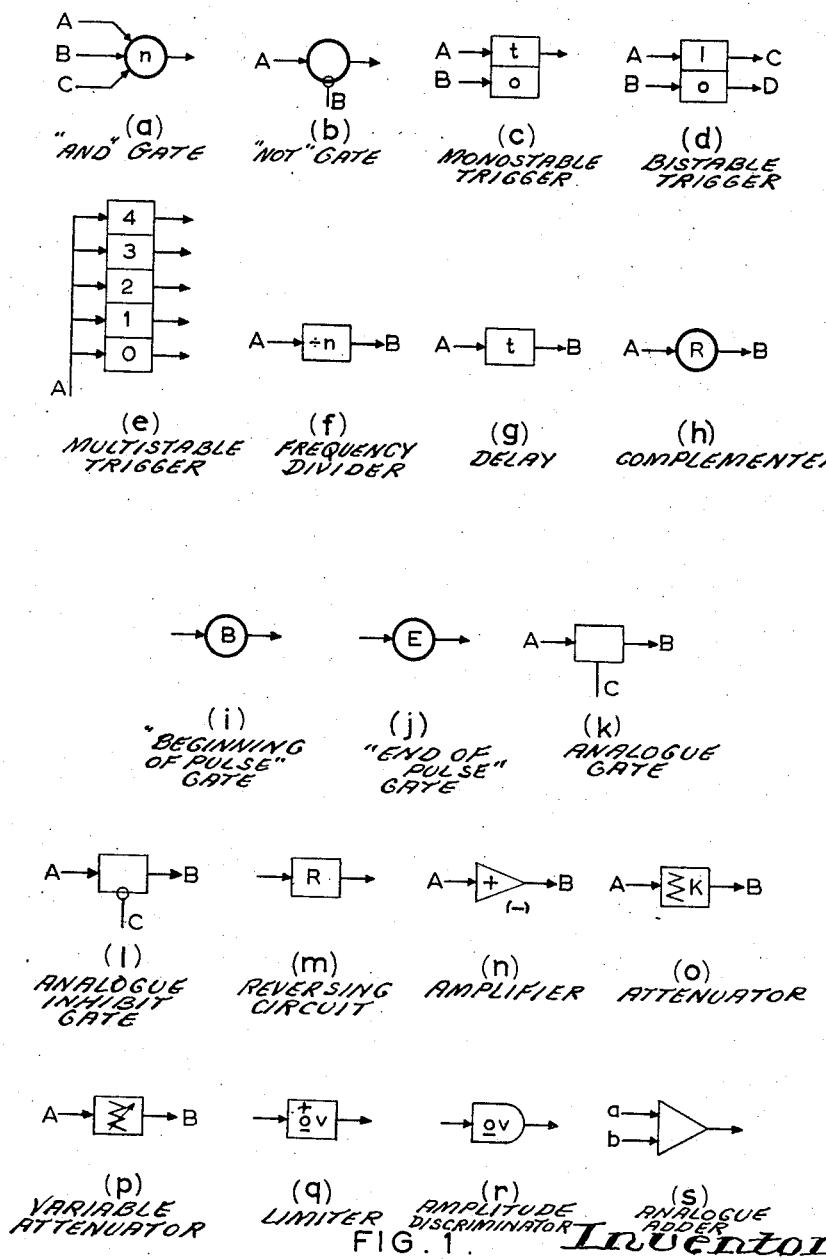

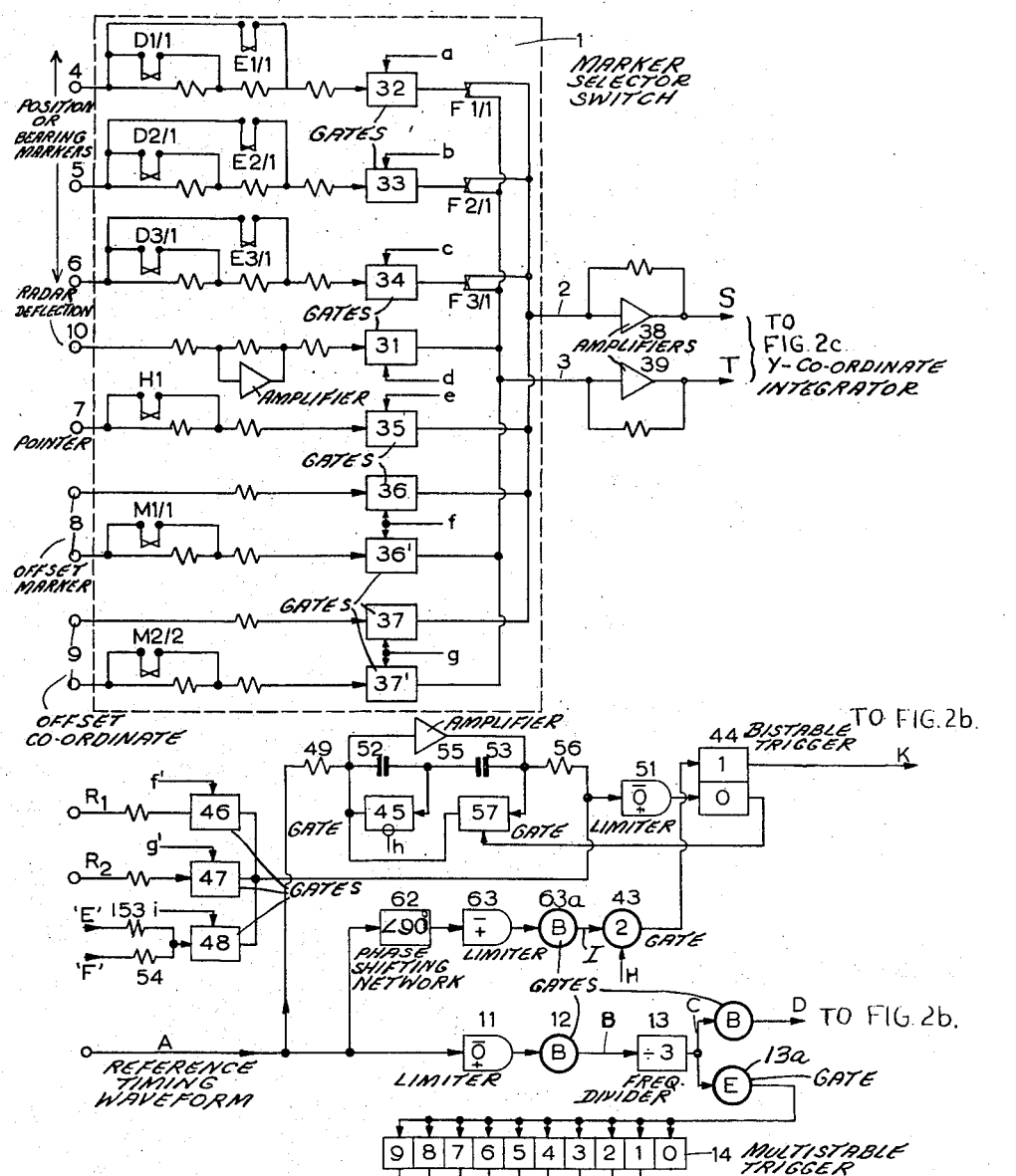

Feb. 4, 1964    E. L. C. WHITE ET AL    3,120,661

RADAR APPARATUS

Filed Oct. 22, 1958      7 Sheets-Sheet 4

Inventors
E. L. C. White
G. N. Hounsfield
K. G. Huntley
By Hauck Downing Heebold
Attys.

United States Patent Office 3,120,661
Patented Feb. 4, 1964

3,120,661
RADAR APPARATUS
Eric Lawrence Casling White, Iver, Godfrey Newbold Hounsfield, Sutton-on-Trent, near Newark, and Keith Gordon Huntley, Dukeswood, Gerrards Cross, England, assignors to Electric & Musical Industries Limited, Hayes, Middlesex, England, a company of Great Britain
Filed Oct. 22, 1958, Ser. No. 768,938
Claims priority, application Great Britain Oct. 24, 1957
22 Claims. (Cl. 343—11)

This invention relates to radar systems and, more especially though not exclusively, to radar display systems provided with a facility known as interscan, such as may be used for airport control or harbour control.

It has been proposed to make provision in radar display systems for displaying additional information in the form of so-called markers on a radar screen between and/or in place of some of the normal radar sweeps and this process is generally known as interscan. The markers are of four types, position markers which identify a position, bearing markers which define a bearing, and offset position and bearing markers, which mark positions and bearings originating from a remote station. A position marker takes the form of a symbol such as a 0 or + placed at the position. A bearing marker takes the form of a straight line, dotted according to a code which distinguishes one bearing marker from another, extending from the centre of the display to its periphery in the direction of the bearing. Offset markers originate from a remote station and therefore have to be translated so as to be correctly positioned on the display. An offset bearing marker consists of a dotted straight line from the position representing the remote station on the display in the direction corresponding to the bearing. An offset position marker is similar to an offset bearing marker except that the line is continuous and of a length representing the range of the marked position from the remote station.

Assuming that the information is displayed on a radar screen under the control of X and Y axis signals, then generation of offset bearing marker control signals, for example, requires X and Y integrators for the generation of the bearing markers and further X and Y inputs to take into account the offset. In the case of a number of displays fed from a single receiver, difficulty is encountered in setting up marker signals individually for the different displays, especially if different scales are employed at the different displays.

The object of the present invention is to reduce the above difficulty in a radar display system with provision for interscan.

According to the present invention, a radar display system comprises a source of video signals, sources of deflection rate potentials including, for each co-ordinate of a radar display, a source of a radar scan potential which represents a function of a radar bearing angle and at least one source of marker scan potential, switching means one for each co-ordinate of the radar display for interleaving said radar scan potential and said marker scan potential to provide a direction rate waveform, at least one radar display means remote from said sources, said display means including a display tube and integrating circuits for each co-ordinate of the radar display for providing deflecting waveforms for said tube, means for applying said video signals to said tube, and means for applying deflecting rate waveforms respectively to said integrating circuits.

In order that the present invention may be clearly understood and readily carried into effect, one embodiment will now be described in detail, by way of example, with reference to the accompanying drawings in which:

FIGURE 1 illustrates symbols employed in the block schematic diagram of FIGURE 2, FIGURE 2, which comprises parts 2a, 2b and 2c, is a block schematic diagram of a radar display system with provision for interscan, and FIGURE 3, which comprises parts 3a, 3b and 3c, shows amplitude/time diagrams of various waveforms referred to in the description of operation of the system of FIGURE 2.

In FIGURE 1, the representations of the symbols are as follows: (a) An "AND" gate where an output is present if $n$ or more inputs are together present at A, B, C, . . . In the special case of $n=1$, the gate is known as an "OR" gate. (b) A "NOT" gate where there is an output if input A is present but not if input B is present. (c) A monostable trigger where a trigger pulse at A initiates an output pulse of duration $t$. A trigger pulse at B, if within the pulse duration, terminates the output pulse, that is, resets the trigger. (d) A bistable trigger where a trigger pulse at A sets to "1" and a trigger pulse at B resets to "0." Output C is present when the trigger is set to "1" and output D is present when the trigger is reset to "0." (e) A multistable trigger or counter where each trigger pulse sets to the next numerically higher condition. An output from the highest condition, is succeeded by an output from 0. Outputs are similar to (d) as described above. (f) A frequency divider where there is an output B for every $n$ pulses at input A. If the output commences on the $r$th pulse then it terminates on the $(r+1)$th pulse. (g) A delay where the output B is a true replica of the input A delayed by time $t$. (h) A complementor having an output at B when an input at A is not present and no output at B when an input at A is present. (i) A shaping circuit or beginning element where an output pulse occurs at the beginning of the input pulse. (j) A shaping circuit or end element where an output pulse occurs at the end of the input pulse. (k) An analogue gate where A is connected to B when pulse C is present. This gate is bilateral. Also the analogue input and output are of opposite polarities. (l) An analogue gate where A is disconnected from B when pulse C is present. (m) A reversing circuit where the modulus of the input is unchanged but has its sign reversed. (n) An amplifier having an input A and an output B. (o) An attenuator having an output B equal to K times the input A. (p) A variable attenuator with input A and output B. (q) Limiter where the output equals the input within the prescribed limits indicated. (r) Amplitude discriminator as in (q) where there is an output when the analogue input is within the prescribed limits indicated. (s) An analogue adder having an output $a+b$. There may be more than two inputs if desired and there is no mutual coupling between the inputs. Practical forms of circuits, such as represented by the symbols are well known, and need not be referred to in detail. For example, a multistable trigger such as represented by the symbol (e) may comprise a ring counter.

Figure 2B:
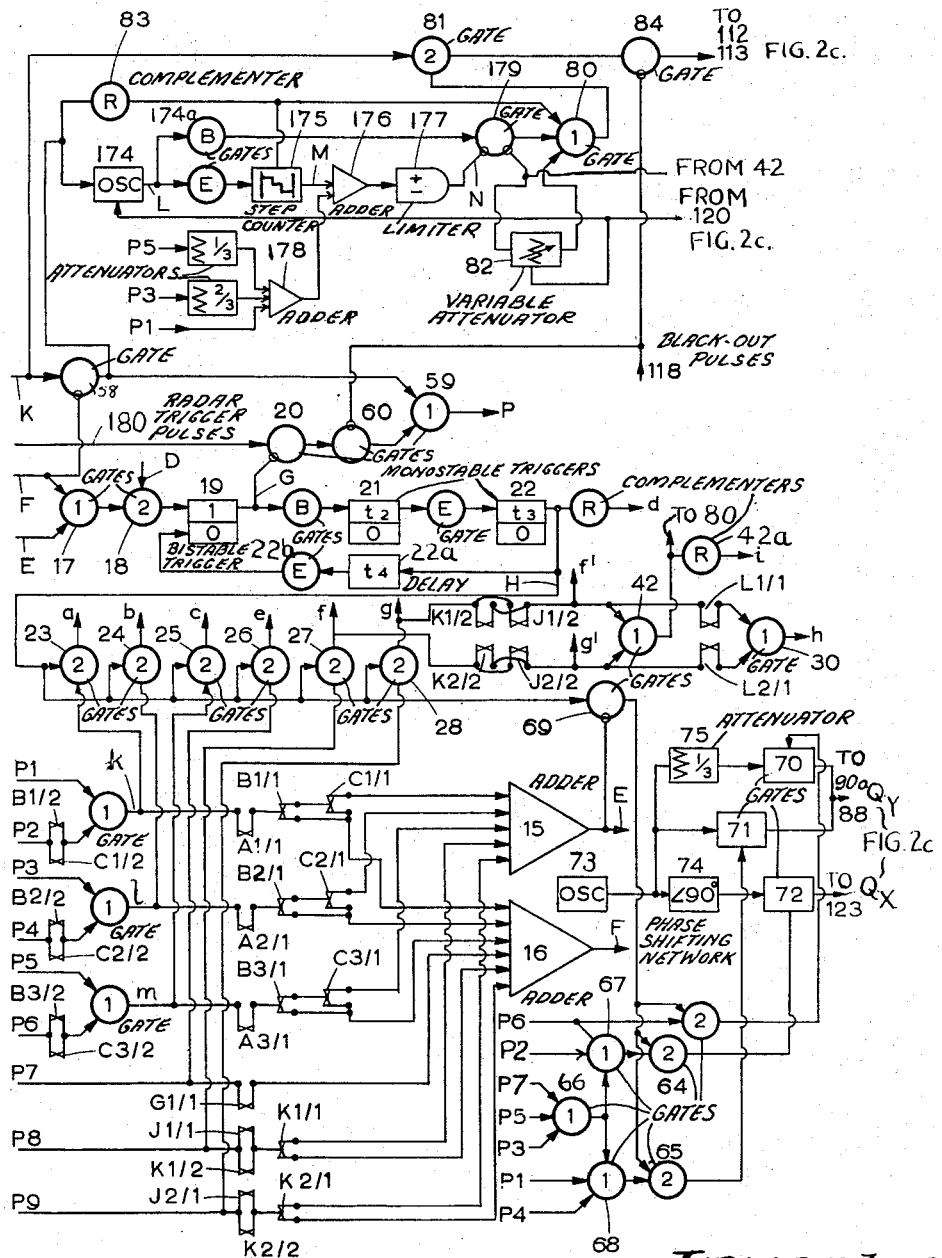
Figure 2C:
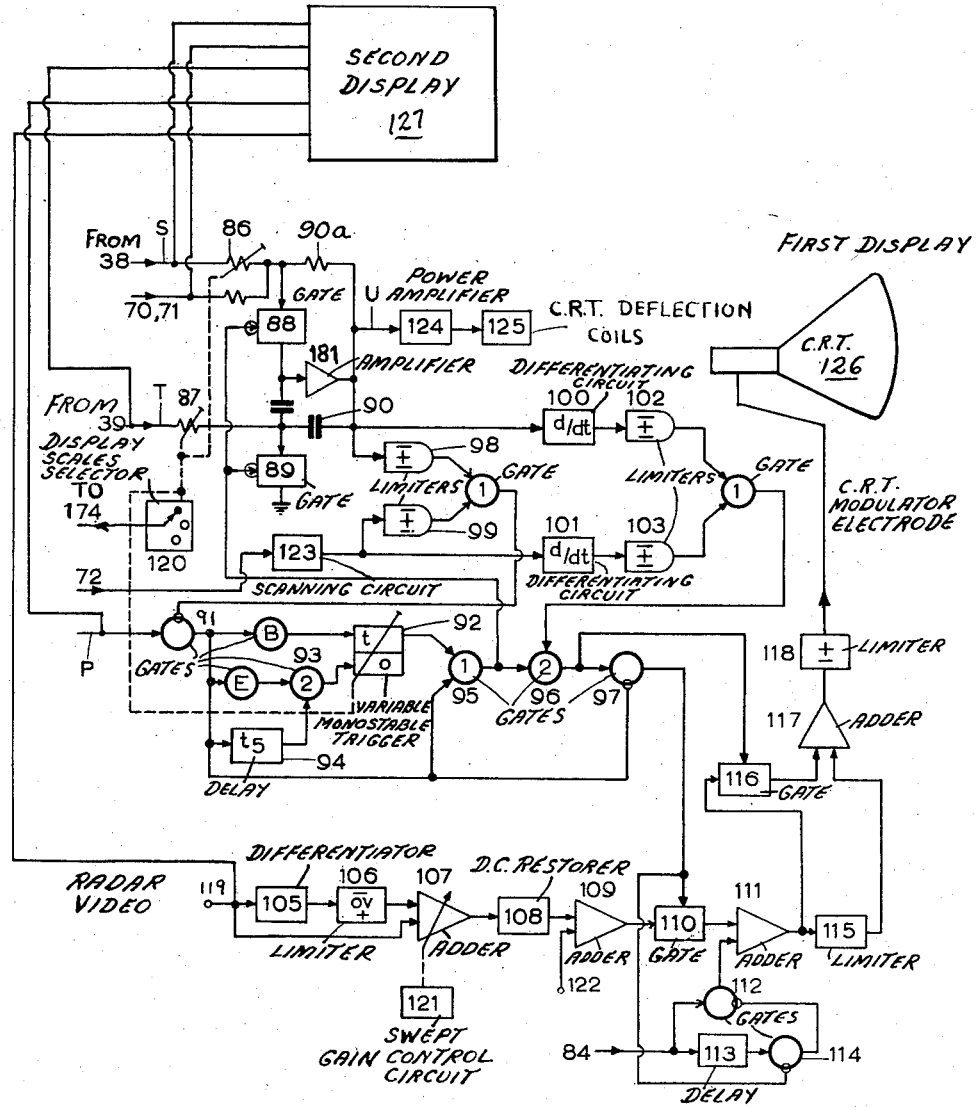

FIGURE 2 comprises parts 2a, 2b and 2c and illustrates in schematic form radar interlace apparatus for interlacing control signals for the generation of markers with normal radar scan control signals. Parts of the apparatus shown in FIGURES 2a and 2b comprise means for applying to two bus-bars S and T outputs representing the Y components of a selected one of a number of shift (offset) and integrator outputs respectively, said integrator output defining the slope of a bearing marker. It also comprises means for supplying radar trigger pulses for synchronising purposes to a bus-bar P (shown in FIGURE 2b) and means for supplying to a bus-bar Q (FIGURE 2b) the Y component of a selected one of a number of marker waveforms. Two further bus-bars are required, one for the X component of the selected shift or integrating output and the other for the X component of the selected marker waveform, but these further bus-bars are not shown in the drawing, nor are the means for supplying them since such further means may be identical to those shown for the Y component. FIGURE 2c comprises the components of a display apparatus which, it will be assumed, is remote from the parts of the apparatus shown in FIGURES 2a and 2b. In practice the complete apparatus comprises more than one display apparatus such as shown in FIGURE 2c, all such display apparatus being supplied from the same bus-bars with shift and integrating outputs, with radar trigger pulses and with marker waveforms. There may moreover be display apparatus located on the same site as the parts shown in FIGURES 2a and 2b. Furthermore in FIGURES 2a and 2b contact switches are shown bearing references such as A1/1, A2/1, A3/1, B1/1, B1/2, B2/1, B2/2 . . . and it is to be understood that these switches are operated by relays A1, A2, A3, B1 (switches B1/1, B1/2), B2 (switches B2/1 and B2/2) . . . which are not shown in the drawings. The relays are, for example, selectively manually operable by a controller from marker source units to give a centralised selection of the shift and integrating outputs and/or of the marker waveforms.

In the apparatus shown in FIGURE 2a, separate "shift" and "integrate" outputs are derived from a selector switch 1 and are applied respectively to bus-bars S and T, which are referred to as the position bus-bar and bearing bus-bar respectively. In the case of a position marker only position bus-bar S is energised: since only a shift equal to the y-co-ordinate of the position is required in the case of a bearing marker, only bearing bus-bar T is energised; since a bearing marker is a line from the centre of the display no shift is needed. For an offset bearing marker, both bus-bars S and T are energised. In the example of FIGURE 2, provision is made in the selector switch 1 for three inputs 4, 5 and 6, which represent either position or bearing markers depending on the states of switches F1/1, F2/1 and F3/1, a pointer position marker input 7, two offset marker inputs 8 and 9 and the normal radar deflection input 10. These inputs are applied to the appropriate bus-bars as hereinafter described.

For a position marker, a potential representing the Y co-ordinate of the position to be marked is applied to one of the inputs 4, 5 or 6, each input corresponding to a different form of marker, and the form being selected as will appear subsequently. For a bearing marker one of the inputs 4, 5 or 6 is energised with a potential representing the sine of the bearing angle. Similarly for a pointer a potential representing the Y co-ordinate of the pointer position is applied to the input 7. In the case of an offset marker, a potential representing the Y co-ordinate of the offset is applied to the upper input 8 or 9, while a potential representing the sine of the bearing angle is applied to the lower input 8 or 9. Switches D1/1, D2/1, D3/1, E1/1, E2/1, E3/1, H1, M1/1, M2/1 allow for variation of the feed resistance to either of two amplifiers 38 or 39 which operate as see-saw amplifiers. The time of switching the required potential to the bus-bars S and T is determined by analogue switches 32 to 37, 36' and 37' which are "enabled" by timing pulses $a$ to $g$ generated as will appear subsequently.

The first action before injecting a marker is to prevent further radar trigger pulses initiating radar sweeps in a display. This action takes place at a time sufficiently before switching deflection potentials to the bus-bars S and T to allow a radar sweep which has just started to be completed. A suitable train of timing pulses is therefore derived from an analogue reference timing waveform A, shown in FIGURE 3a, which is applied to a limiter 11 and the "beginning of pulse" gate 12, FIGURE 2a, the timing pulse train from the gate 12 being of the form of waveform B of FIGURE 3a and having the same frequency as the radar trigger pulses.

To provide a reasonable marker repetition rate, which is sufficiently high to avoid flicker and not so high as to depreciate the radar display, waveform B is applied to a divider (÷3), 13, the output waveform C of which modified by the end of pulse gate 13a, triggers a 10-way counter 14 to provide marker selecting pulses at output P1 to P9.

In the example being described, a maximum of six different types of markers to be displayed may be inserted in the scan in succession. Three of these markers may require two sweep periods, and at the most only one in three sweeps may be suppressed to allow for the insertion of markers. The repetition period for any one marker is arranged to be thirty radar sweep periods, the marker repetition periods being timed by the pulses which are output from counter 14. The pulses P1 to P9 are also employed for selecting the markers in succession by routing the successive marker selecting pulses P1 to P9 from counter 14 of FIGURE 2a via various relay contacts to summing amplifiers 15 and 16 of FIGURE 2b. The various relay contacts shown in the drawing are operated by the energisation of their actuating winding under manual control from their respective marker source units. The manually operated switches and the rest of the relay winding circuits are not shown in the drawing for the sake of clarity. The marker selector pulse inputs $k$, $l$, $m$, P7, P8, P9 to amplifiers 15 and 16 also direct the pulse H through one of the gates 23, 24, . . ., 28 so that timing pulses $a$, $b$, $c$, $e$, $f$ and $g$ are formed in succession, and current from the marker sources 4, 5, 6, 7, 8 and 9 of FIGURE 2a in turn is directed to one or other or both of the bus-bars S and T via gates 32 to 37 and 36' and 37'.

It will be noted that pulses $k$, $l$, $m$, occur twice during each cycle of the counter 14, provided that either of the respective relay contacts B/2 and C/2 are closed. The relays which close contacts B/2 and C/2 are operated when displaying position markers and it will be seen hereinafter that the marker symbols chosen require two consecutive traces in each case. When displaying bearing markers one trace only is necessary in each case since a bearing marker is merely a straight line whereas the position markers chosen involve more complex shapes and thus contacts B1/2, B2/2, C1/2 and C2/2 are opened.

Figure 3A:
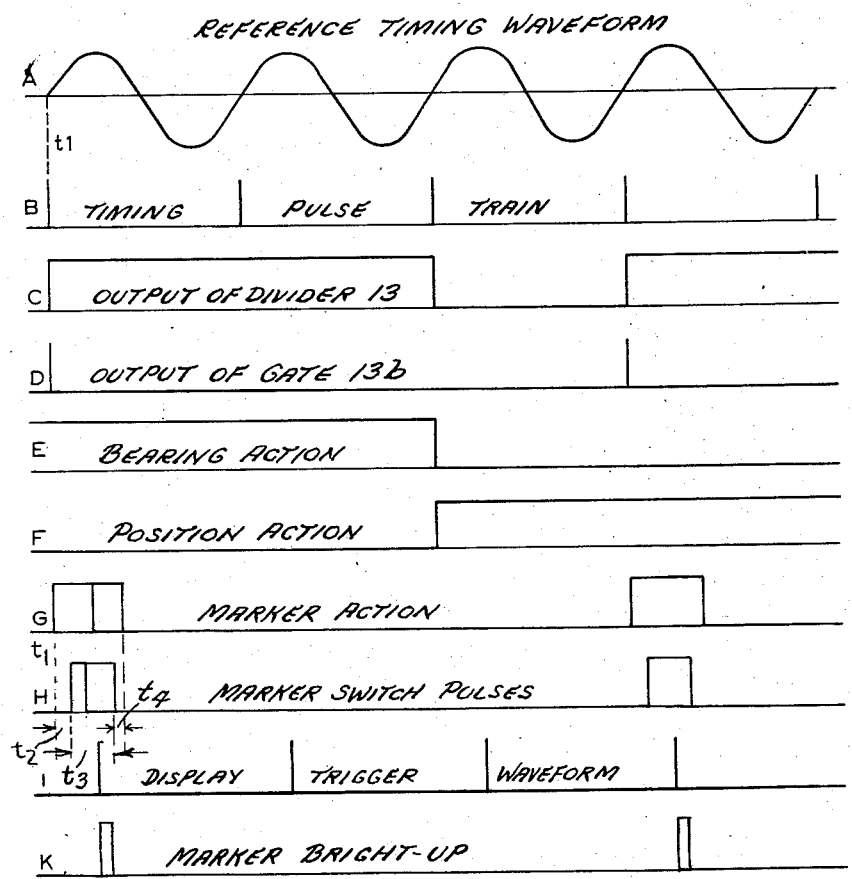

The output waveforms from amplifiers 15 and 16, respectively, parts of which may be as represented by E and F in FIGURE 3a and which represent respectively bearing action and position action, are added in gate 17, FIGURE 2b, to produce a pulse the presence of which indicates that a marker is to be displayed. In practice pulses E and F would not usually follow immediately one behind the other. The duration of E or F is that of one of the pulses P1 to P9 unless contacts B1/2, B2/2, C1/2 or C2/2 are closed, in which case the duration of pulses F may be twice that of one of the pulses P1 to P9. The pulse from gate 17 is then used to gate marker trigger waveform D of FIGURE 3a, derived by applying waveform C to a "beginning of pulse" gate 13b, in FIGURE 2a, by means of the gate 18, FIGURE 2b, an output from which triggers the bistable trigger 19. Thus marker action is initiated by waveform G of FIGURE 3a and radar trigger pulses are inhibited at gate 20 by waveform G. The radar trigger pulses flow in bus-bar 180. This inhibition is maintained until such time as the marker display sequence is terminated.

After the commencement of radar inhibition, time $t_1$ in FIGURE 3a, sufficient time must elapse for a radar sweep just started to be completed. Thus the marker action output from 19 is suitably delayed by a time $t_2$, by a monostable trigger 21 and "end of pulse" gate before triggering the marker switch pulse generator 22. The marker switch pulse waveform H of FIGURE 3a, selectively "enables" gates 23 to 28 and removes pulse $d$, the selection being dependent upon the timing of the pulse E or F as the case may be. In the electronic switch 1 therefore the normal radar deflection input 10, FIGURE 2a, via switch 31, is removed and the relevant marker analogue input is connected by one of switches 32 to 37.

If the marker to be displayed is a bearing marker which is simply a straight line starting from the centre of the display in a direction defining the bearing, which condition is only applicable to the inputs 4, 5 and 6, then the relevant relay contact F1/1, F2/1 or F3/1 will be in the position in which no analogue potential can be applied via the gate 32, 33 or 34 to the bus-bar 2 and thence to position bus-bar S. Thus the output from an amplifier 38, which is connected between bus-bar 2 of FIGURE 2a and bus-bar S of FIGURES 2a and 2c, will be zero and since, at this stage, as will appear subsequently the integration gates in the display apparatus are open, that is, the integrator is in the reset condition, the spot in the display will reset to the centre. The integrand, for subsequent integration during the marker display period, is connected via relay contacts F1/1, F2/1 or F3/1 to an integrand amplifier 39, connected between bus-bar 3 of FIGURE 2a and the bearing bus-bar T of FIGURES 2a and 2c.

If a position marker is to be displayed, the analogue input is connected to bus-bar 2 either via one of the relay contacts F1/1, F2/1 or F3/1 or, in the case of a pointer input to 7, permanently. Thus, the output from the integrand amplifier 39 will be zero and the marker shift potential will appear at the output of amplifier 38.

If an offset marker is to be displayed, deflection voltages will be applied via switches 36 or 37, 36' or 37' to both bus-bars 2 and 3. The offset shift thus appears at the output of amplifier 38 and the integrand for drawing the line appears at the output of amplifier 39.

When marker action has been taken, sufficient time is allowed to elapse for the position and bearing outputs from amplifiers 38 and 39 and the display deflection circuits to reach their final values, and display trigger waveform I of FIGURE 3a, which occurs at the peaks of the timing reference waveform A, initiates the actual display. The waveform I is obtained by passing waveform A through a 90° phase shifting network 62, limiter 63 and beginning of pulse element 63a, of FIGURE 2a. Gate 43 has been "enabled" by the marker switch pulse output H from trigger 22 of FIGURE 2b and thus the bistable trigger 44 of FIGURE 2a is set to condition "1" by the next display trigger pulse, of waveform I. Subsequent action is best described separately for each type of marker.

When an offset position marker is to be displayed, there is an output from a gate 42 of FIGURE 2b and no output $i$ from the complementer 42a, because at least one of the switches J1/2, J2/2, K1/3, K2/3 has been closed by the controller. However for a simple position marker, there is no output from gate 42 and hence pulse $i$ is present and no output $h$ is obtained from gate 30. This pulse $i$ "enables" a gate 48 of FIGURE 2a and the position action pulse is added to the output of an integrator 55 by means of two resistors 54 and 56. Alternatively in the case of a simple bearing marker, the bearing action pulse is added to the output of the integrator 55 by means of the two resistors 153 and 56.

The action after the bistable trigger 44 is set to "1" by the output 43 is as follows in the case of a simple position marker. Since there is no "0" output from trigger 44, a switch 57 is an open circuit and the integrator 55 is charged by a resistor 49. The integrating capacity is the value of a condenser 53, since pulse $h$ is not present and thus a switch 45 is closed to short out a series-connected condenser 52. When the integrator output reaches a potential determined by the ratio of resistors 56 and 54 and by the amplitude of the position action pulse F, a discriminator 51 gives an output and trigger 44 is triggered back to "0," so completing the cycle. A marker "bright-up" has thus been produced at the output of trigger 44, shown as waveform K of FIGURE 3a, the duration of which may be determined by a suitable choice of the value of resistor 54. This pulse eventually passes through gates 81 and 84, FIGURE 2b, and is the marker "bright-up" pulse fed to the display. Gate 84 is thus connected to gates 112, 113 of FIGURE 2c.

The action of bright-up pulse generation for a bearing marker which is not offset is the same as that just described for a position marker, but the pulse duration has to be somewhat longer so that the scanning circuits in the display have time to trace the line representing the bearing on the display tube. When displaying a bearing marker, position action pulse F is replaced by bearing action pulse E which is compared with the output of integrator 55 in resistors 153 and 56. By making resistor 153 suitably larger in value than resistor 54, the longer marker "bright-up" pulse required is produced.

To draw a line on the display, the marker "bright-up" pulse, in the case of bearing markers only, must open the integration gates in a display sawtooth generator. That is, as far as the display apparatus are concerned, a bearing marker must be treated in the same way as a radar spoke. Thus a gate 58, FIGURE 2b, is "enabled" by waveform K since position action, waveform F, is not present and the marker "bright-up" pulse is added into the radar trigger pulse bus-bar P at gate 59. The marker "bright-up" pulse is, for a bearing marker, gated with suitable interruption at the gate 81 to produce different dot patterns, as hereinafter described, before being passed to the display video amplifier.

The action required for an offset position marker is the same as that for a local bearing marker except that the length of line must be accurately determined. For this purpose, the X and Y integrators in the display are fed with alternating potentials of constant amplitude and of the same frequency as the timing reference waveform A, via the electronic marker selector switch 1. The potentials are derived initially from a magslip resolver in a remote station at which the offset marker is set up by an operator. The direction of the line drawn is determined by relationship between the resolver output potentials, and the length of the line by the range of the target from the remote station. Since the timing reference potential A is integrated in integrator 55, at any time the output of the integrator 55 is therefore a direct measure of the length of line drawn at the display. Thus when displaying an offset position marker, a D.C. potential $R_1$ or $R_2$ proportional to range, that is, the length of line required, is fed via either a switch 46, for the case of marker input 8 or a switch 47, for the case of marker input 9, respectively, to the discriminator 51 where it is compared with the output of integrator 55 to terminate the pulse from trigger 44 at the appropriate time. Pulses $f'$ and $g'$ are present when an offset position marker is to be displayed from inputs 8 and 9, respectively. The analogue scale of these range inputs may be controlled by pulse $h$, via relay contacts L1/1 and L2/1, and gate 30, FIGURE 2b, opening switch 45 to reduce the integrating capacity in a predetermined ratio, by connecting condensers 52 and 53 in series.

It should be noted that the length of line drawn at the display is independent of the amplitude of the reference waveform A, provided that the same supply is connected to the integrator 55 via resistor 49 and to energise the magslip at the remote station representing the angular co-ordinate of the radar deflection.

In the case of an offset bearing marker, neither pulse $f'$ nor pulse $g'$ is present, so that switches 46 and 47 are open circuited. Pulse $i$ is, however, present and the action is the same as for a local bearing marker as described above.

For setting up an offset marker to start from a desired position, switching is provided to produce a simple dot control by the offset potentials. In this condition, the relevant offset input potential to switch 36 or 37 is used to provide a simple position marker as described above. After a time sufficient for the display of the longest marker, say $t_3$, the monostable trigger 22 returns to "0." The trigger 22 is triggered initially by trigger 21 after marker action, which in turn occurs a ¼-cycle of the reference waveform A prior to the relevant display trigger pulse. From these considerations, the nominal value for the duration of the marker switch pulse from trigger 22 may be derived, $t_3$ say. When trigger 22 returns to "0," the marker switch pulse is terminated and the position "output" from the electronic switch 1 returns to zero, bringing the spot at the display to the centre, and the bearings "output" is reconnected to the radar deflection input 10 ready for the next radar spoke. Finally, after a suitable delay, $t_4$, produced by the action of the delay circuit 22a and "end of pulse" circuit 22b in FIGURE 2b, during which delay the deflection circuits in the display settle down, the marker action pulse is terminated, which removes the inhibiting signal to gate 20 and normal radar operation is resumed.

The simplest of the marker symbols produced is a circle distinguishing the pointer input 7. This is generated by applying sine waves in phase quadrature simultaneously to the X and Y axes of the display.

During the pointer marker cycle, pulse P7 from the counter 14 is present and it "enables" gates 64 and 65 (FIGURE 2b) via the "OR" gates 66, 67, 68. The marker switch pulse H from trigger 22 is thus connected, via gates 69, 64 and 65, to "enable" two analogue switches 71 and 72. Thus similar sine waves from an oscillator 73 are connected directly to the symbols Y output (that is the bus-bar $Q_Y$ for the Y component of marker waveforms) and in quadrature to the symbols X output $Q_X$, the quadrature relationship being achieved by a network 74 giving a 90° phase shift. These symbol outputs are added to the position deflection potentials from amplifier 38, FIGURE 2a, in the display as hereinafter described.

The marker symbol associated with input 4 is a plus sign and is generated by applying similar sine waves to the bus-bars $Q_Y$ and $Q_X$, and thus to the X and Y axes, successively. This is carried out in two marker injection periods corresponding to pulses P1 and P2 from the counter 14. During pulse P1, the gate 65 of FIGURE 2b is "enabled" by way of gate 68 and the marker switch pulse H connects the output from oscillator 73 via switch 71 to bus-bar $Q_Y$. During pulse P2, however, gate 64 is "enabled," by way of gates 66 and 67, and the marker switch pulse connects the output of oscillator 73 via switch 72 to the bus-bar $Q_X$. In this case, the phase shift introduced by a network 74 is irrelevant.

The marker symbol associated with input 5 is a circle with a vertical diameter and the marker symbol associated with input 6 is an ellipse. The sine wave supplied for the Y axis which is the minor axis of the ellipse is supplied by way of an attenuator 75 and a switch 70. The operation of the gates associated with the marker symbol oscillator for these marker symbols is otherwise self-explanatory.

Figure 3B:
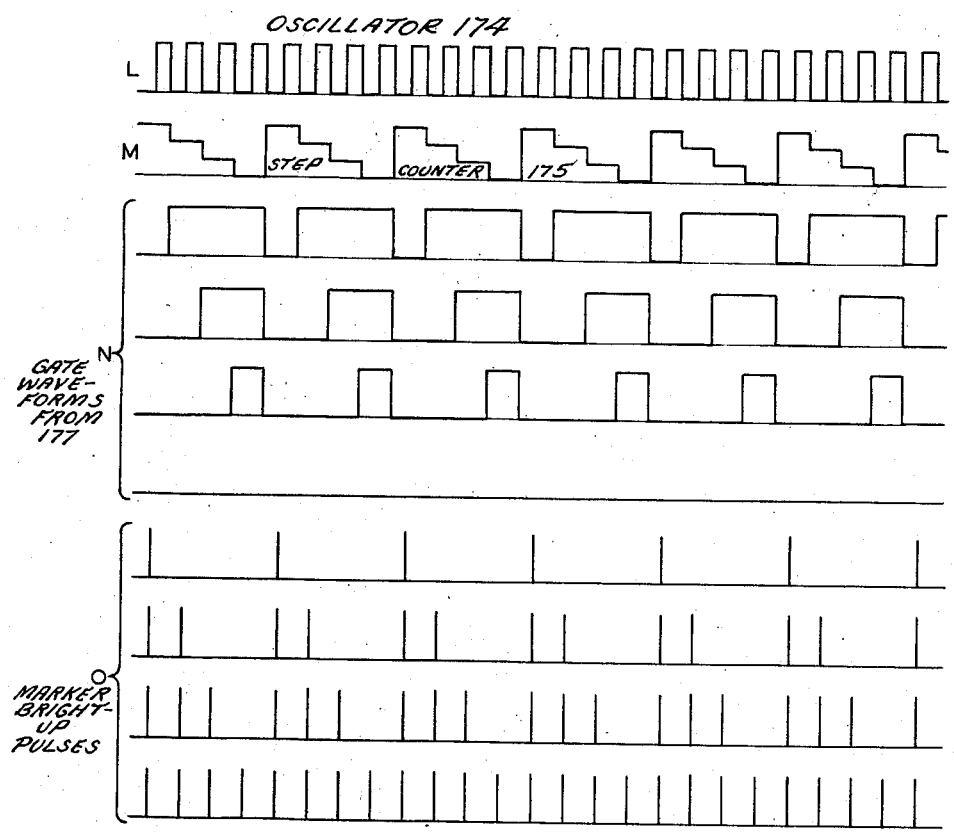

A system of brightness modulation is provided for coding bearing lines. The duration chosen for the dots is sufficiently short that the brilliance of the display is not affected by the writing speed. So that the dot coding may appear with a constant spacing regardless of the display range setting, the master frequency generating the pattern is adjusted when the display scale is changed. As there may be two or more displays in the complete apparatus, separate pattern generators are provided for each display, the time scale of each generator being controlled from its associated display. Thus when two displays are in use, two bearing coding units are required containing components as shown in FIGURE 2b. These components include a square wave oscillator 174 which is switched on at the commencement of the bearing marker pulse, that is, at the beginning of the bearing line, so that the oscillator 174 is effectively synchronised to the display timing, as shown at waveform L, FIGURE 3b. The time scale of FIGURE 3b is much larger than that of FIGURE 3a since the frequency of the timing reference waveform A is about 400 c/s whereas the p.r.f. of the waveform L varies between 100 Kc/s and 1 Mc/s depending on the scale setting of the switch 120. Furthermore the oscillator frequency is adjusted by a signal from a display scale selector 120 shown in FIGURE 2c. The controlling edges of waveform L drive a step counter 175 to give waveform M. A suitable amount of this staircase waveform after polarity reversal is selected at an adder 176 and a limiter 177 to provide one of the gate waveforms N. FIGURE 3b shows how this waveform varies according to the amount or code selected. The amount of staircase waveform required to produce a given gate waveform from limiter 177 is controlled by a D.C. potential injected at adder 176. The D.C. control is derived from the relevant selector pulses P1, P3 or P5 from the counter 14. Suitable D.C. levels corresponding to the dotting codes associated with inputs 4, 5 and 6 are derived by appropriate attenuation of the outputs of counter 14 and are applied via the amplifier 178 to the adder 176. It should be noted that for the code associated with an offset bearing marker, there is no output from network 178 and no output from limiter 177. The respective waveform N inhibits "pips" derived by the beginning of pulse circuit 174a from the leading edges of waveform L in a gate 179 to give the required one of the code waveforms O (FIGURE 3b). This passes via gates 80 and 81, which latter gate is "enabled" by the bearing "bright-up" pulse, to the display apparatus as a gated marker "bright-up."

The full line required for the offset position marker is generated by applying the offset position signal from gate 42 to the "OR" gate 80. At the same time, the gate 179 is inhibited by the output from the gate 42 so that no dots are applied to the gate 80. The brightness of this continuous marker line will, of course, vary inversely with the writing speed for a given cathode ray tube beam current. An amplitude control 82 is hence necessary, controlled by a display scale signal from 120, FIGURE 2c, to compensate for this effect and to give equal brightness on all scales.

The bearing marker pulse is complemented at a complementor 83 so that in its absence gate 81 is "enabled." Thus a marker "bright-up" pulse output in the same way as during a local position marker is passed directly to the display.

To economise in power supply equipment, a black-out pulse is supplied to line 118, FIGURE 2b, should the mains supply fall momentarily sufficiently for the voltage stabilisers in the power supply equipment to cease functioning. The black-out pulse removes gated marker "bright-up" pulses and radar trigger pulses from the displays by means of gates 60 and 84 and prevents the display of false information during the transients.

The position and bearing deflection outputs from amplifiers 38 and 39, FIGURE 2a, are fed to a Y-deflection waveform changer, FIGURE 2c, which has two inputs, namely a shift input via a variable resistor 86 and an integration input via a ganged variable resistor 87. The circuit is substantially as described in greater detail in United States Patent No. 2,843,736 and, with the resetting or shift condition, both of two switches 88 and 89 are conducting. Feedback in an amplifier 181, via integrating arm 90, is thus by-passed to ground and the device acts as a simple "see-saw" amplifier with resistive input and output arms 86 and 90a, respectively. The overall gain of the amplifier is controlled to give various display scales by varying the input arm 86, in response to the display scale selector 120. In the integrate condition, switches 88 and 89 are both open circuited. Feedback via condensers 90 is therefore re-established whilst the feedback path via resistors 90a and 86 is disconnected. The device then acts as a conventional so-called "Miller" integrator.

A similar X-deflection waveform changer is represented generally by the block 123 and is of the same construction as that just described, the two deflection waveform changers controlling respectively the Y and X axes in the display tube 126.

The various operations in the display are initiated by radar/bearing trigger waveform P which sets a monostable trigger 92. For a simple radar sweep, the trigger is a narrow pulse of shorter duration than $t_5$ the delay of element 94, such as $a$ of waveform P, FIGURE 3c. A gate 93 is thus not "enabled" during a radar sweep and the output from trigger 92 lasts the full duration "$t$." Such an output is called a display integrator gate pulse, such pulses comprising waveform R of FIGURE 3c. This reset time "$t$" is adjusted by the scale selector 120 to be equal to the time required to scan one radius. The action is similar for the display of a bearing marker, although in this case the input trigger pulse waveform P is present for the duration of the marker. Gate 93 is therefore "enabled" and the monostable trigger 92 is reset at the end of the trigger pulse. However, the pulse duration is still the same as with the radar spoke, that is, equivalent to one radius.

When an offset position marker is to be drawn the required sweep duration may be either greater or less than that required to scan one radius. The required duration is, in fact, the length of the radar/bearing trigger pulse. Thus the monostable trigger 92 and a gate 95 are arranged so that the combined output from gate 95 is a replica of the input waveform P provided the input pulse duration exceeds $t_5$. When the duration is less than $t_5$ as for a radar trigger then the output from trigger 92 has a duration "$t$." This may be seen at waveform R. When a display integrator gate pulse R is present, the deflection generator 86 to 90a is switched, by the switches 88 and 89, to the integrating condition (radar sweeps and bearing lines) whilst, at all other times, the deflection changer acts as a linear amplifier (reset to the centre or position marker).

Figure 3C:
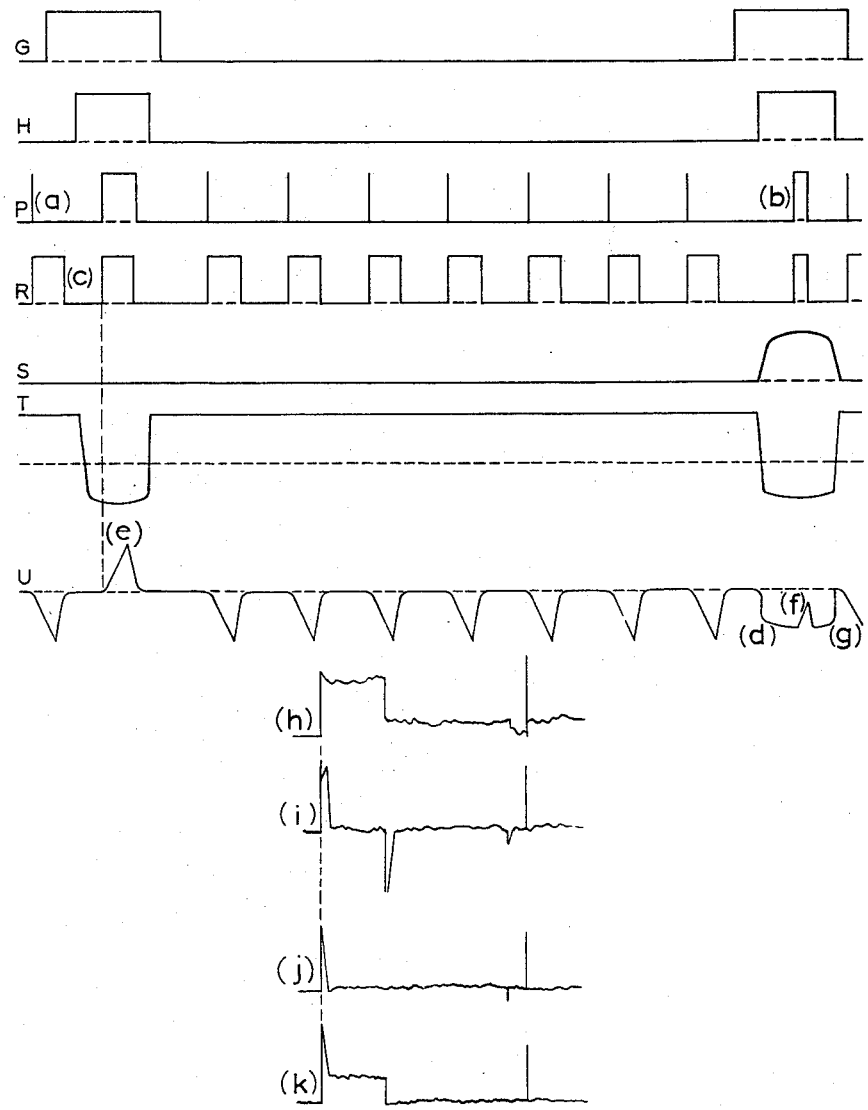

Considering now the injection of the markers shown in FIGURE 3c, at the commencement of marker action (waveform G) radar trigger is inhibited, as for example at (b) waveform P. After a time sufficient for the completion of any radar scan previously initiated, as at (c) waveform R, the marker switch pulse waveform H is initiated and connects the relevant analogue potentials to the position deflection and bearing deflection bus-bars S and T, respectively. At the same time, the deflection generator output reproduces a position deflection input, as at (d) waveform U, which is applied to a voltage-to-current converter 124, FIGURE 2c, and thence to deflection coils 125 of the cathode ray tube 126 to deflect the spot to the required position. After a waiting period, marker "bright-up" is initiated and, in the case of a position marker, this is the only action required.

To display either a bearing or an offset marker, a line is to be drawn and thus the bearing deflection input is integrated as at (e) and (f) waveform U. This integration is initiated and terminated by the relevant display integrator gate pulse R. At the termination of the marker switch pulse the position and bearing input return to their normal condition and the display resets to the centre, as at (g) in waveform U.

The radar video input 119 to the display is first fed to a differentiator 105 and to a limiter 106, as shown in FIGURE 2c. The limiter 106 prevents negative-going signals at the end of a differentiated echo. In FIGURE 3c, (h) is the input signal and (i) shows the result after differentiation. The output from the limiter 106 is shown at (j). To make the display picture more intelligible, some of the undifferentiated display signal is mixed in at an adder 107 giving the result shown at (k) in FIGURE 3. The gain of the summing amplifier 107 may be varied both manually and by means of an electronic swept gain control 121. The signal is D.C. restored in network 108 prior to mixing in the marker source heading marker signal 122 at an adder 109.

The video signal output from adder 109 is suppressed at all times, except during an actual radar sweep, in a gate 110. The control pulse for this gate is thus required to be present only during integration periods associated with the radar display. The display integrator gate pulse waveform R which occurs during all integration periods is inhibited by radar/bearing trigger in a gate 97, which follows an "AND" gate 96, and hence, during a bearing or offset marker, gate 97 is "disabled," but, since the radar trigger is extremely short, gate 110 is open during practically the whole radar sweep period. With this arrangement a small amount of information is lost at the commencement of each radar scan, but, nevertheless, this has the desirable effect of helping to eliminate a bright spot at the centre of the display.

Marker "bright-up" pulses from gate 84, FIGURE 2b, are processed at a gate 112 delay network 113 and a gate 114, to safeguard the cathode ray tube screen from burning, and are added in at an amplifier 111. It is to be noticed that due to gate 110 the radar video signal is always inhibited during marker injection. The composite output from 111 is routed via either a gate 116 or a limiter 115. For radar signals and bearing lines gate 116 is "enabled" and the full signal is applied to a final amplifier 117. In the case of position markers however, gate 116 is "disabled" and reduced signal is fed via 115 to the final amplifier 117. This is necessary since the writing speed when displaying the position marker signals is considerably less than for other markers. A final limiter 118 prevents damage to the cathode ray tube electron gun, the output of 118 being the modulating signal for the cathode ray tube 126.

The differentiating circuits 100, 101 and the limiters 102, 103, whose outputs are applied via a buffer gate to the two gate 96, are provided to enable the gate 96 only of either or both the X or Y deflection rate to exceed a safe minimum. Thus, in accordance with the invention, position and bearing signals are applied along common bus-bars to separate display arrangements such as the one shown in detail and the second one indicated by the rectangle 127, each of which arrangements is provided with integrating means and scale setting means. In the drawings, FIGURE 2c illustrates in detail one example of such a display arrangement and it will be noticed that only one part of the integrating means, namely that for control of the Y-axis of the display, is shown in detail, the remaining part, for control of the X-axis of the display, being of similar construction.

Hence, the present invention avoids the disadvantage of a complex and uneconomical arrangement which would arise if separate bus-bars were employed for each scale required for the display and also the disadvantage of requiring of the bus-bars both a good frequency response and accurate waveform, so as to avoid the possibility of exaggeration of so-called "centre wander" in a display with a magnified scale which would be the case if common integrating means and bus-bars were employed for each display.

A further advantage of the present invention is that by performing all switching of marker and radar signals prior to the integrating means at each display, the switches may be relatively slow acting, except for those forming part of the display integrating means themselves, which are comparatively few in number.

What we claim is:

1. A radar display system comprising at least two cathode ray tubes able to provide different displays, separate integrating means for providing the scanning waveforms for each display tube, separate scanning circuits for said display tubes responsive to the output signals of the respective integrating means, each integrating means including scale selector means for varying the time constant of integration so as to vary the range scale of the respective display, and signal sources common to said display tubes, and including a source of signal to be integrated by each integrating means, and a source of video signal to be displayed by each tube, a source of a reset signal for each integrating means, integrating means further including means for resetting the output signal to values determined by the respective reset signal, so as to determine the scan origin for the respective display, said common signal source including a source of switching signals for alternatively switching said integrating means to integrate and reset conditions, said source of switching signals comprising means for providing marker-action signals of different durations to denote bearing and position markers, means for providing radar trigger signals of different duration from marker-action signals, and means for selectively replacing said trigger signals by said marker-action signals, and each cathode ray display tube having a duration discriminator circuit responsive to radar trigger signals and marker-action signals, and an input circuit for applying signals to be displayed to the respective cathode ray tube, said input circuit responding to the output of said discriminator circuit to connect the display tube modulator electrode to different video signal input terminals.

2. A radar display system according to claim 1 said source of video signal comprising means for applying received radar signals to one of said input terminals, and means for applying marker waveforms to another of said output terminals.

3. A radar display system according to claim 2 said means for applying marker waveforms to said other input terminal comprising separate means for each display tube for providing an impulsive waveform the mark-to-space ratio of which is responsive to scale selector means of the respective display tube.

4. A radar display system comprising at least two cathode ray tubes able to provide different displays, separate integrating means for providing the scanning waveforms from each display, separate scanning circuits for said display tubes responsive to the output of the respective integrating means, there being one integrating means for each co-ordinate of each display, each integrating means including a first input terminal for a signal to be integrated, a second input terminal for a reset signal, and a switch for alternately switching the respective integrating means to integrate and reset conditions, and signal sources common to said display tubes, said sources including first sources, one for each co-ordinate of signals to be integrated, second sources one for each co-ordinate of reset signals, a source of switching signals, and a source of video signals, first bus bars connecting said first sources to respective first input terminals, second bus bars connecting said second sources to respective second input terminals, a third bus bar connecting said third source to each switch, and a further bus bar for supplying video signals to the modulator electrode of each display tube.

5. A radar display system according to claim 4 said first source comprising means for providing electrical quantities representing respectively the sine and cosine of a bearing angle, said second sources comprising means for providing electrical quantities representing respectively the co-ordinates of a position.

6. A radar display system according to claim 5 comprising switch means for selectively applying signals from said first and second sources to said first bus bars, to said second bus bars and to both said first and second bus bars in timed relationship with said switching signals.

7. A radar display system as claimed in claim 6 comprising a multi-stable trigger responsive to basic timing pulses for generating sequential pulses, and switches operated by said sequential pulses for selecting different electrical quantities from said first and second source means.

8. A radar display system as claimed in claim 4 comprising a video signal source including means for coding bearing lines by brightness modulation of the display tube beam as the line is written.

9. A radar display system as claimed in claim 8, comprising for each display tube a separate beam modulation wave generator, the frequency of each generator being responsive to the scale of the respective display to provide the same brightness modulation coding for all scales.

10. A radar display system as claimed in claim 4, in which each integrating means include variable value components for varying the respective integration time constant, whereby the scale of each display may be separately determined.

11. A radar display system as claimed in claim 5, said second source comprising integrators for integrating said electrical quantities representing the co-ordinates of a position.

12. A radar display system as claimed in claim 10, in which each integrator includes an amplifier having a capacitive feedback path, the value of which feedback path is varied by a switch controlled by a timed pulse.

13. A radar display system comprising a source of video signals, sources of deflection rate potentials including, for each co-ordinate of a radar display, a source of a radar scan potential which represents a function of a radar bearing angle and at least one source of marker scan potential, switching means one for each co-ordinate of the radar display for interleaving said radar scan potential and said marker scan potential to provide a deflection rate waveform, at least one radar display means remote from said sources, said display means including a display tube and integrating circuits for each co-ordinate of the radar display for providing deflecting waveforms for said tube, means for applying said video signals to said tube, and means for applying deflecting rate waveforms respectively to said integrating circuits.

14. A radar display circuit comprising a source of video signals, sources of deflection rate potentials including a source of a first radar scan potential which represents the sine of a radar bearing angle, and a source of a second radar scan potential which represents the cosine of a radar bearing angle, a plurality of display means remote from said sources, each of said display means including a display tube and two integrating circuits for providing deflecting waveforms for said tube, means for applying said first and second radar scan potential respectively to said integrating circuits, and each of said display means further including scale selector means for varying the time constants of the integrating circuits of the respective display means.

15. A radar display circuit comprising a source of radar video signals; a source of marker bright up signals; sources of deflection rate potentials including for one co-ordinate of a radar display a source of a first radar scan potential which represents the sine of a radar bearing angle and a plurality of sources of first marker scan potentials which represent the sines of marker bearing angles, and including for a second co-ordinate of a radar display a source of a second radar scan potential which represents the cosine of said radar bearing angle and a plurality of sources of second marker scan potentials which represent the cosines of said marker bearing angles; first switching means for selecting among said first marker scan potentials and interleaving selected potentials in time with said first radar scan potential to produce a first deflection rate waveform, second switching means operative in times relationship with said first switching means for selecting among said second marker scan potentials and interleaving selected potentials in time with said second radar scan potential to provide a second deflection rate waveform; third switching means operative in timed relationship with said first and second switching means for selecting marker bright up signals to accompany marker scan potentials; a plurality of display means remote from said sources and said switching means, each of said display means including a display tube and two integrating circuits for providing deflecting waveforms for said tube; means for applying said first and second deflection rate waveforms to said integrating circuits respectively; means for applying said radar video signals to said display tube during the occurrence of radar scan potentials in said deflection rate waveforms; and means for applying said marker bright up signals to said radar display tube.

16. A radar display system according to claim 15, each integrating circuit including scale selector means for varying the time constant of integration so as to vary the range scale of the respective display.

17. A radar display system according to claim 16, said source of marker bright up signals including means for producing individual bright up signals for the different display means, and means for adjusting the amplitude of the marker bright up signals for a particular display means in response to operation of the respective scale selector means to vary the range scale of the display.

18. A radar display system according to claim 15, said source of marker bright up signals including means for producing different bright up signals to accompany marker scan potentials from different sources.

19. A radar display system according to claim 15 comprising means for providing switching signals which are timed in relation to the operation of said first, second and third switching means, and each integrating circuit including means responsive to said switching signals for alternately switching said integrating circuits to integrate and reset conditions.

20. A radar display system comprising a source of radar video signals; a source of marker bright up signals; sources of deflection rate potentials including for one co-ordinate of a radar display a source of a first radar scan potential which represents the sine of a radar bearing angle and a plurality of sources of first marker scan potentials which represent the sines of marker bearing angles, and including for a second co-ordinate of a radar display a source of a second radar scan potential which represents a cosine of said radar bearing angle and a plurality of sources of second marker scan potentials which represent the cosines of said marker bearing angles; a plurality of sources of offset potentials including for one co-ordinate of the radar display a plurality of sources of first offset potentials representing the sines of positions and including for a second co-ordinate of the radar display a plurality of sources of second offset potentials representing the cosines of said positions; first switching means for selecting among said first marker scan potentials and for interleaving selected potentials in time with said first radar scan potential to produce a first deflection rate waveform, second switching means operative in timed relationship with said first switching means for selecting among said second marker scan potentials and interleaving selected potentials in time with said second radar scan potential to provide a second deflection rate waveform; third switching means operative in timed relationship with said first and second switching means for selecting marker bright up signals to accompany selected marker scan potentials; fourth switching means operative to select among said first offset potential sources and to interleave selected potentials in time to provide a first positioning waveform; fifth switching means operative in timed relationship with said fourth switching means to select among said second offset potential sources and to interleave selected potentials to provide a second positioning waveform; display means remote from said sources of said switch means, said display means including a display tube, two integrating circuits for providing deflecting waveforms for said tube, each integrating circuit including an integrate input terminal and a reset input terminal; means for applying said first and second deflection rate waveforms respectively to the integrate input terminals of said integrating circuits; means for applying said first and second positioning waveforms respectively to the reset input terminals of said integrating circuits; means for applying said radar video signal to said display tube during the occurrence of radar scan potentials in said deflection rate waveforms; means for applying said selected marker bright up signals to said display tube, and means for selectively conditioning the integrating circuits to produce deflecting waveforms in response to said deflection rate waveforms and to produce positioning signals in response to the respective positioning waveforms.

21. A radar display system according to claim 18, said means for selectively conditioning the integrating circuit to produce deflecting waveforms and positioning signals comprising means for providing switching signals which are timed in relation to the operation of said first to fifth switching means.

22. A radar display system according to claim 18 further comprising means responsive to operation of said fourth and fifth switching means to provide first and second marker waveform potentials, and means for superimposing said marker waveform potentials respectively on said first and second positioning waveforms.

References Cited in the file of this patent
UNITED STATES PATENTS

| | | |
|---|---|---|
| 2,692,381 | Huber | Oct. 19, 1954 |
| 2,775,757 | Ellsworth | Dec. 25, 1956 |